(12) United States Patent
Jagow et al.

(10) Patent No.: US 11,930,735 B2
(45) Date of Patent: Mar. 19, 2024

(54) IMPLEMENT FRAME MOUNTED PRODUCT METERS

(71) Applicant: Bourgault Industries Ltd., St. Brieux (CA)

(72) Inventors: Scot Jagow, St. Brieux (CA); Douglas Novlan, St. Brieux (CA); Glenn Hantke, St. Brieux (CA)

(73) Assignee: Bourgault Industries Ltd., St. Brieux (BZ)

( * ) Notice: Subject to any disclaimer, the term of this patent is extended or adjusted under 35 U.S.C. 154(b) by 274 days.

(21) Appl. No.: 17/615,865

(22) PCT Filed: Jun. 23, 2020

(86) PCT No.: PCT/CA2020/050872
§ 371 (c)(1),
(2) Date: Dec. 2, 2021

(87) PCT Pub. No.: WO2020/257924
PCT Pub. Date: Dec. 30, 2020

(65) Prior Publication Data
US 2022/0304220 A1    Sep. 29, 2022

(30) Foreign Application Priority Data

Jun. 25, 2019    (CA) ...................... 3047567

(51) Int. Cl.
*A01C 7/08* (2006.01)
*A01C 7/06* (2006.01)

(52) U.S. Cl.
CPC ................ *A01C 7/084* (2013.01); *A01C 7/06* (2013.01)

(58) Field of Classification Search
None
See application file for complete search history.

(56) References Cited

U.S. PATENT DOCUMENTS

| | | | | |
|---|---|---|---|---|
| 4,473,016 A | * | 9/1984 | Gust ...................... | A01C 7/081 406/185 |
| 5,379,706 A | * | 1/1995 | Gage ...................... | A01C 15/04 406/146 |
| 5,592,889 A | * | 1/1997 | Bourgault .............. | A01C 7/081 111/178 |
| 7,497,269 B2 | * | 3/2009 | Jagow .................. | A01B 73/046 172/311 |

(Continued)

*Primary Examiner* — Joseph A Dillon, Jr.
(74) *Attorney, Agent, or Firm* — Frost Brown Todd LLP; Nicole M. Tepe (57) ABSTRACT

A product distribution system for an air seeder includes a plurality of furrow openers and a plurality of product distributors mounted on an implement frame. Each product distributor comprises a seed container and a plurality of seed delivery conduits extending radially outward from the seed container A seed meter apparatus is connected to receive the seed product from the seed container and operative to meter seeds of the seed product into each of the seed delivery conduits. A seed product dispenser is operative to convey a seed product from a seed product tank into each seed container, and is operative to maintain a level of the seed product in each seed container above a selected level. The product distributors are spaced across the width of the implement frame.

24 Claims, 7 Drawing Sheets

(56) References Cited

U.S. PATENT DOCUMENTS

| | | | | |
|---|---|---|---|---|
| 8,955,445 B2* | 2/2015 | Riffel | .................... | A01C 7/084 |
| | | | | 340/684 |
| 9,148,990 B2* | 10/2015 | Redman | .................. | A01C 7/20 |
| 9,271,439 B2* | 3/2016 | Bourgault | .............. | A01B 49/06 |
| 9,295,191 B2* | 3/2016 | Jagow | .................... | A01C 7/082 |
| 9,591,800 B2* | 3/2017 | Kowalchuk | ............ | A01C 7/102 |
| 9,699,953 B2* | 7/2017 | Jagow | .................... | A01B 73/00 |
| 9,826,676 B2* | 11/2017 | Borkgren | .............. | A01C 7/042 |
| 2008/0308025 A1* | 12/2008 | Cresswell | .............. | A01C 21/00 |
| | | | | 111/188 |
| 2011/0035163 A1* | 2/2011 | Landphair | .............. | A01C 7/105 |
| | | | | 702/45 |
| 2016/0205865 A1* | 7/2016 | Friggstad | ................ | A01C 7/06 |
| 2019/0023504 A1* | 1/2019 | Roberge | ............... | A01C 21/002 |
| 2020/0053955 A1* | 2/2020 | Borkgren | .............. | A01C 7/082 |
| 2022/0264788 A1* | 8/2022 | Jagow | .................... | A01C 7/082 |

* cited by examiner

IMPLEMENT FRAME MOUNTED PRODUCT METERS

CROSS-REFERENCE TO RELATED APPLICATIONS

This application claims the benefit of, and priority to, International Patent Application No. PCT/CA2020/050872, entitled "Implement Frame Mounted Product Meters," filed Jun. 23, 2020, which claims the benefit of, and priority to, Canadian Patent Application No. 3047567, filed Jun. 25, 2019, the contents of each are incorporated, in their entirety, for all purposes.

BACKGROUND

Agricultural air seeders include generally an implement frame and a plurality of furrow openers spaced across a width of the frame, and movable to a lowered operating position where the furrow openers engage the ground to create furrows as the frame moves along a field. Agricultural products such as seed, fertilizer, and the like are carried in tanks mounted on the frame or a cart pulled with the frame. The agricultural products are distributed to the furrow openers by a product distribution system where one or more fans create one or more air streams and metering devices dispense the agricultural products into the air streams and the products are carried through an air distribution network made up of conduits and manifolds to the furrow openers, and then into the furrows. Furrow opener assemblies often create two (or more) separate furrows, and separate air streams carrying different agricultural products are connected so as to deposit the different products in the separate furrows.

Metering devices for metering agricultural products can be of the volumetric type with no regard to individual seeds, or the singulating type where seeds are metered individually. Singulating meters most commonly include a seed disc rotating in a vertical plane about a horizontal rotational axis, but it is also known to mount the seed disc to rotate in a horizontal plane about a vertical rotational axis, such as the Titanium™ line of meters made by J. Assy Agricola illustrated at http://www.jassy.com.br/plantio/

Typically the tanks have floors sloping to a tank outlet and metering devices such as rollers or augers are mounted under the tank outlets. Product flows from each tank into the metering device which dispenses the product into an air stream which carries the product through a distribution network to the furrow openers. Depending on the system employed, the air stream carrying the product may be divided one or two times before reaching the furrow openers. The distribution network typically includes bends and turns and the product is not uniformly distributed in the air stream, such that accurately delivering equal amounts of product to each furrow is problematic.

U.S. Pat. No. 9,148,990 to Redman et al. and U.S. Pat. No. 9,591,800 to Kowalchk et al. show an alternate distribution system where an inductor apparatus at the bottom of the tank receives the product and directs the product into an air stream that delivers it on-demand to a plurality of metering modules that are mounted on the implement frame. Each metering module includes a secondary container to receive the product, and a metering device. The product is metered from the secondary container into a secondary air stream flowing through a plurality of product conduits, each of which is connected to a furrow opener. Each metering module thus meters product to a laterally spaced section of furrow openers.

U.S. Pat. No. 5,379,706 to Gage discloses a seed tank mounted on an implement frame with a number of inductor type seed distribution units under the tank. Seed conduits extend radially from each seed distribution unit. Each seed conduit connected to a seed metering unit mounted on the implement frame.

With the metering devices much nearer to the final destination at the furrow openers, accuracy can be improved. The individual metering modules also facilitate sectional control whereby each laterally spaced section of furrow openers can be individually controlled by stopping and starting the application of each metering module and also by changing application rates.

SUMMARY OF THE INVENTION

The present disclosure provides a product distribution system for air seeders that overcomes problems in the prior art.

In a first embodiment the present disclosure provides a product distribution system for an air seeder. The system comprises a plurality of furrow openers mounted on an implement frame of the air seeder and a plurality of product distributors mounted on the implement frame. Each product distributor comprises a seed container and a plurality of seed delivery conduits extending radially outward from the seed container. A seed meter apparatus is connected to receive the seed product from the seed container and operative to meter seeds of the seed product into each of the seed delivery conduits. A seed product dispenser is operative to convey a seed product from a seed product tank into each seed container, and is operative to maintain a level of the seed product in each seed container above a selected level. The product distributors are spaced across the width of the implement frame.

In a second embodiment the present disclosure provides a product distribution system for an air seeder. The system comprises a mixed product container mounted on an implement frame of the air seeder. A first primary meter is operative to meter a first product from a first product tank into the mixed product container, and a second primary meter is operative to meter a second product from a second product tank into the mixed product container. A plurality of container meters, where each container meter is operative to meter a mixed product from the mixed product container into a corresponding delivery conduit at a selected mixed dispensing rate such that the mixed product is dispensed from the mixed product container at a total mixed dispensing rate. A meter control is operative to control a first dispensing rate of the first primary meter, a second dispensing rate of the second primary meter, and the total mixed dispensing rate.

The meter control is operative to substantially simultaneously start the first and second primary meters and operative to substantially simultaneously stop the first and second primary meters to maintain a desired proportion of first and second products, and to maintain a level of mixed product in the mixed product container above a minimum level.

In a third embodiment the present disclosure provides a method of distributing agricultural products in an air seeder. The method comprises metering a first product at a first dispensing rate from a first product tank into a mixed product container mounted on an implement frame of the air seeder; metering a second product at a second dispensing rate from a second product tank into the mixed product container; metering a mixed product at a total mixed dispensing rate from the mixed product container into a plurality of delivery conduits; substantially simultaneously starting and stopping metering the first and second products to maintain a level of mixed product in the mixed product container above a minimum level.

To facilitate arranging the components of an air seeder such that the air seeder can be folded into a transport position the present disclosure provides a compact product distribution system where the seed container is mounted on the implement frame in proximity to the furrow openers and supplied by a seed product dispenser. Seed delivery conduits can extend radially in all directions from the seed container as required in any particular arrangement such that the distance between the seed container and the furrow openers, and thus a length of the seed delivery conduits which are typically also located in all directions from the seed container, can be minimized.

In conventional systems the seed delivery conduits extend out in the same direction from the seed container and so the seed container must be lengthy enough to accommodate the number of outlets the seed delivery conduit that are required, however in the present system the radial arrangement allows the seed container itself to be compact, taking up significantly less space.

The system is versatile and can be combined with a conventional product distribution system, or used as a standalone system with product dispensers conveying seeds and fertilizers into separate containers on the frame. Various metering systems and delivery conduit arrangements can readily be used with the disclosed system, and singulation of seeds can also be provided.

The present disclosure also provides a product distribution system that conveniently transfers products from two different product tanks and mixes them into a mixed product container at varying desired proportions. The mixed product is then delivered to the furrow openers of the air seeder with proportions of each product changing according to rate change locations indicated on a field map.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
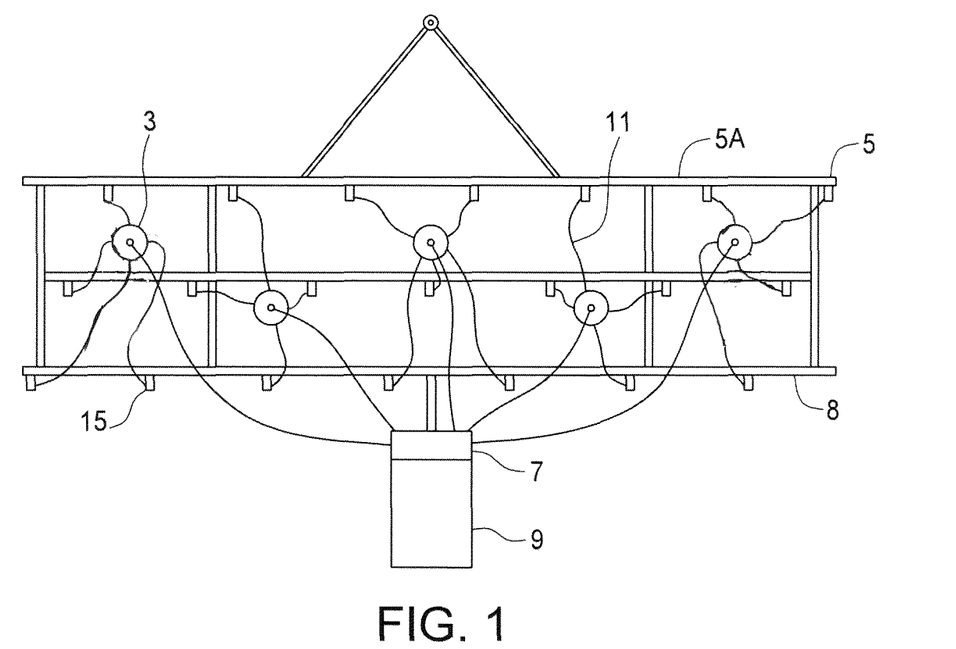
FIG. 1 is a schematic top view of an embodiment of the system of the present disclosure, with the implement frame of the air seeder in the operating position.
Figure 1A:
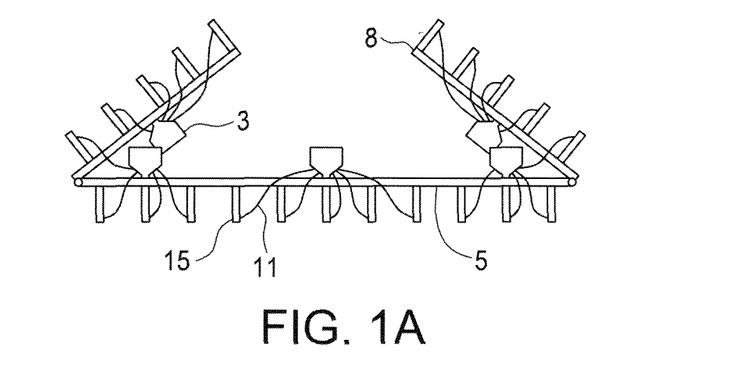
FIG. 1A is a schematic rear view of the embodiment of FIG. 1, with the implement frame of the air seeder in the transport position.
Figure 2:
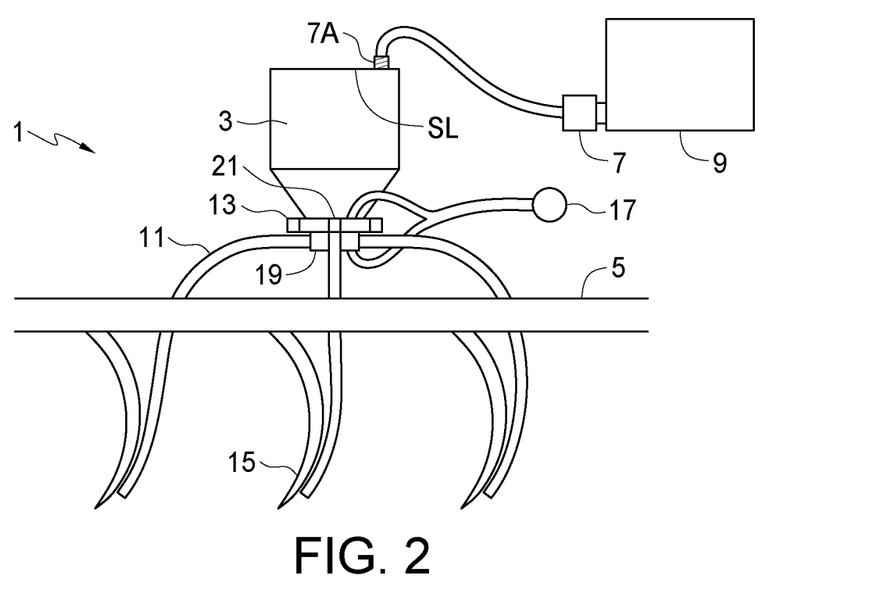
FIG. 2 is a schematic side view of a product distributor of the embodiment of FIG. 1.
Figure 2A:
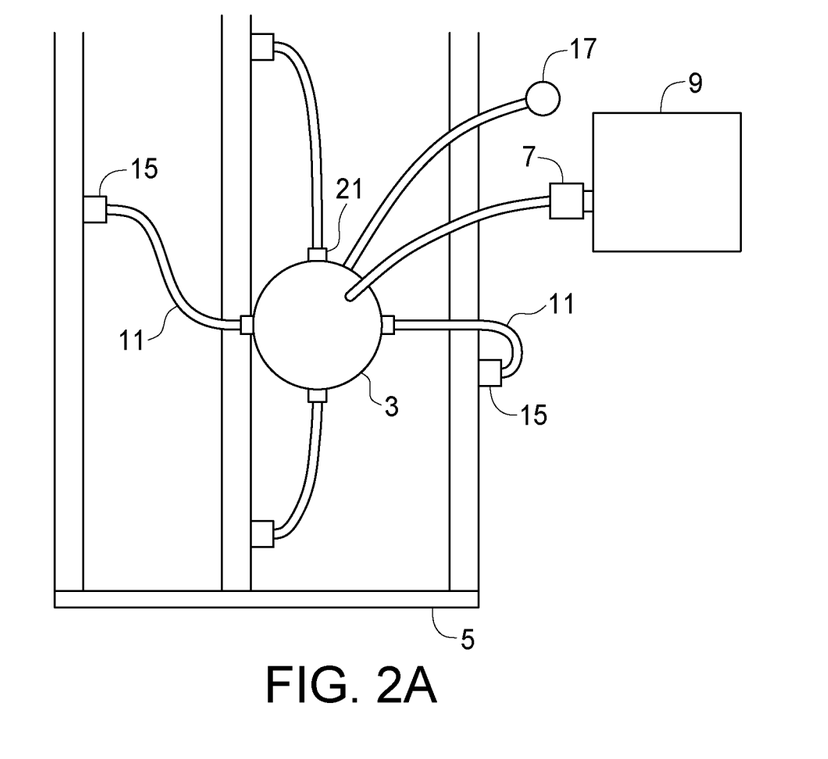
FIG. 2A is a schematic top view of the product distributor of FIG. 2.

FIGS. 1-2A schematically illustrate an embodiment of a product distribution system 1 of the present disclosure for an air seeder. The system 1 comprises a plurality of product distributors mounted on an implement frame 5 of the air seeder and spaced across the width of the implement frame 5. Each product distributor comprises a seed container 3, a plurality of seed delivery conduits 11 extending radially outward from the seed container 3, and a seed meter apparatus 13 connected to receive a seed product from the seed container 3 and operative to meter seeds of the seed product into each of the seed delivery conduits 11.

A lower portion of each seed container 3 tapers inward to a bottom of the seed container where seeds are dispensed outward radially in desired directions from the bottom of the seed container 3.

The implement frame 5 comprises a plurality of lateral frame members 5A extending across a width of the implement frame and spaced between a front of the implement frame and a rear of the implement frame. The furrow openers 15 are spaced along the lateral frame members 5A, and the seed delivery conduits 11 extend radially outward from each seed container 3 and connect to furrow openers 15 located forward, rearward, right, or left of the seed container as needed. The illustrated implement frame 5 includes wing sections 8 that fold to a transport position shown in FIG. 1A.

A seed product dispenser 7 is operative to convey the seed product from a seed product tank 9 into the seed container 3, and operative to maintain a level of the seed product in the seed container above a selected level SL. The seed product dispenser 7 is illustrated as an on-demand dispenser as is known in the art where seeds are carried through a primary conduit by an air stream into the seed container 3 until the seeds begin to block the screen 7A, at which time the air flow slows to such an extent that seeds are no longer carried into the seed container 3. When the seed level drops, the screen 7A opens and air and seeds begin to flow again. Alternatively the seed product dispenser could be a conventional meter of an air seeder, controlled by level sensors in the seed container, essentially as described below with respect to an alternate embodiment of the system.

The seed delivery conduits 11 extend generally radially outward in forward, rearward and lateral directions from each seed container 3. A seed meter apparatus 13 is connected to receive the seed product from the seed container 3 and is operative to meter seeds of the seed product into each of the seed delivery conduits 11 which are connected at output ends thereof to furrow openers 15 mounted to the implement frame 5. The seed meter apparatus 13 can readily be provided by separate roller meters 21 spaced around the bottom of the seed container 3 such that a small amount of seed in the seed container 3 will still be sufficient to ensure seeds are available to each of the roller meters for metering seeds into each seed delivery conduit 11. The seed delivery conduits 11 extend radially from the bottom of the seed container 3 and can be bent and curved forward, rearward, right and left toward the required furrow opener locations.

Typically a pressurized air source 17 will direct a pressurized air stream into a plenum 19 connected to each seed delivery conduit 11, such that an air stream flows through each seed delivery conduit 11. The seed meter apparatus 13 can readily be provided by separate roller meters 21 metering seeds into each seed delivery conduit 11. The roller meters 21 can each be driven and controlled individually if desired to achieve variable rates between furrow openers.

The seed meter apparatus 13 can be configured to resist air flow from the seed delivery conduits 11 to the seed container 3 by using an air lock as is known in the art. Alternatively the pressurized air source 17 can be connected to the bottom of the seed container 3 to substantially equalize air pressure between the input and output of each roller meter 21. Since the seed container 3 is not sealed, the pressurized air source 17 is connected to the bottom of the seed container 3 such that the seeds in the seed container 3 above the input of the pressurized air source 17 will resist air flow out of the seed container 3 through the screen 7A of the on-demand seed product dispenser 7. The selected seed level SL can be near the top of the seed container 3 to increase this resistance to air flow. Where the seed product dispenser 7 is provided by an on-demand dispenser with the screen 7A on top of the cover of the seed container 3, the seed level SL will be at the top of the seed container 3.

The air released through the screen 7A can be very dusty and toxic, if seed treatments are applied, and can also be corrosive where fertilizer is carried in the air stream. Instead of releasing this air to atmosphere it may be desired to provide a housing around the screen to capture the released air and direct it through a tube to the furrows created by the furrow opener where same can be at least partially sealed into the ground.

By orienting the seed delivery conduits 11 so they extend in all directions from the seed container 3, the space occupied on the implement frame 5 is reduced. The conventional arrangement where all the seed delivery conduits are aligned along one side of the seed container result in a seed container of extended length. By extending the seed delivery conduits 11 in all directions from the seed container 3, the seed container 3 can be made much smaller. Also more direct routes for the seed delivery conduits 11 can be used as opposed to those systems where all seed delivery conduits extend in the same direction from the seed container.

Adding a number of seed containers 3 fed by on-demand dispensers 7 to the wide air seeders common today is problematic. These air seeders, often with five or more lateral sections, must be folded to a transport position for travel along roads. A simple transport arrangement is schematically illustrated in FIG. 1A. During the folding process the sections move toward each other and any additions to the sections must be arranged so they do not interfere with the folding process. The disclosed product distribution system 1 reduces the space occupied by the seed containers 3 and seed delivery conduits 11 and simplifies that arrangement. The seed containers 3 can be staggered forward and rearward on the implement frame 5 as seen in FIG. 1, so that when folded the seed containers 3 will be forward and rearward of each other to reduce interference. As illustrated in further embodiments below, the system 1 can be arranged around existing conventional product distribution systems, taking up little if any additional space.

When nearing the end of a seeding operation it may be desired to reduce the amount of seeds remaining in the seed container 3 to reduce the time to clean out and change to a different seed. The system 1 may then be operated with no product being dispensed into the seed container 3 from the on-demand dispensers 7. To accomplish this stoppage of feeding, depending on the particular arrangement, valves may be installed to seal off the seed container 3 or other appropriate measures taken. In a conventional elongated seed container of the prior art where all delivery conduits extend in the same direction, when reducing the amount of seeds in the seed container it is necessary to ensure that the whole length of the seed container contains seeds or some meters may not dispense seeds. This can be problematic in hilly terrain where side slopes will cause the seeds to move to one side of the seed container. It can be seen that with the more compact seed container 3 of the present disclosure, this problem is significantly reduced, and so the amount of seed remaining to be cleaned out can be also reduced.

Figure 3:
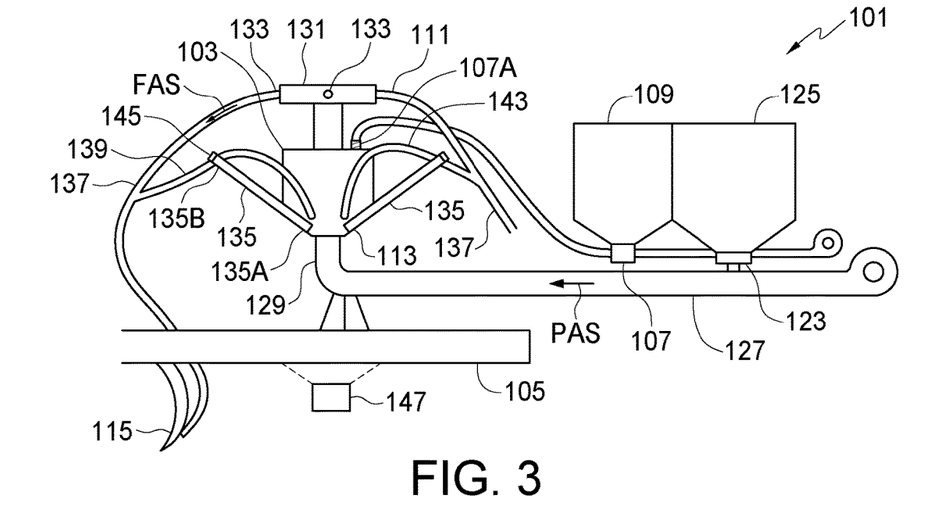
FIG. 3 is a schematic side view of an alternate embodiment of the system of the present disclosure mounted in cooperation with a conventional product distribution system.

FIG. 3 schematically illustrates an alternate product distribution system 101 of the present disclosure that further includes a fertilizer distribution system. The system 101 comprises a seed container 103 mounted on an implement frame 105 of the air seeder. An on-demand seed product dispenser 107 is operative to convey a seed product from a seed product tank 109 into the seed container 103, and operative to maintain a selected level of the seed product in the seed container 103. A plurality of seed delivery conduits 111 extend generally radially outward in forward, rearward and lateral directions from the seed container 103 and a seed meter apparatus 113 is connected to receive the seed product from the seed container 103 and is operative to meter seeds of the seed product substantially equally into each of the seed delivery conduits 111.

The system 101 is built around a substantially conventional product distribution system known in the art. A fertilizer meter apparatus 123 is operative to dispense a fertilizer product from a fertilizer product tank 125 into a primary air stream PAS flowing through a primary conduit 127. A substantially vertically oriented supply conduit 129, as is known in the art, is mounted on the implement frame 105 and connected to the primary conduit 127 and is operative to receive at least a portion of the primary air stream PAS. A manifold 131 is mounted on an upper end of the supply conduit 129, also as is well known in the art, wherein the manifold 131 is operative to direct a final air stream FAS out of the manifold 131 through each of a plurality of manifold ports 133 spaced around a circumference of the manifold 131. In the illustrated system 101 the seed conduits 111 are provided by the same conduits that convey the fertilizer in a conventional distribution system. Each seed delivery conduit 111 is connected at an input end to one of the manifold ports 133, and is connected at an output end to a furrow opener 115 mounted to the implement frame 105.

Alternatively the seed delivery conduits 111 could be separate from the fertilizer delivery conduits as in further alternative systems described below. Further alternatively the fertilizer can be divided by providing extra manifold ports. When mixing the seed and fertilizer into the same delivery conduit the rate of fertilizer is limited because an excess of fertilizer very close to the seed can damage the emerging plants. Where higher fertilizer rates are desired it is common to direct some of the fertilizer into the seed furrow, and direct the balance of the desired fertilizer into a separate furrow that will be close enough to benefit the emerging plants, but not close enough to cause damage. To this end additional manifold ports can be provided. A substantially equal rate of fertilizer will be dispensed through each port, with some of the ports delivering to the seed conduit to mix with the seed, and other ports delivering to a separate fertilizer conduit connected to discharge in a separate furrow.

The number of manifold ports required to feed the furrow openers is known, but additional ports can be added which are directed to the fertilizer furrows. For example where the manifold is feeding six furrow openers and it is desired to apply 90 pounds per acre of total fertilizer to the field, a manifold with twelve ports can be provided with half the ports connected to the six seed conduits and half to six fertilizer furrows. The rate of fertilizer mixed with the seed would be 45 pounds per acre, and the rate dispensed directly into the fertilizer furrow would also be 45 pounds per acre.

Where it is felt that would be excessive, the manifold could instead define eighteen ports with six connected to the six furrow openers and twelve connected to the six fertilizer furrows (ie. two to each fertilizer furrow). The rate of fertilizer mixed with the seed would then be 30 pounds per acre, and the rate dispensed directly into the fertilizer furrows would be 60 pounds per acre, again for a total of 90 pounds per acre.

The vertical supply conduit 129 extends upward through the seed container 103, such that the seed container 103 surrounds the vertical supply conduit 129, providing a compact arrangement. In this system 101, the seed meter apparatus comprises a plurality of rotatable augers 135 extending generally radially outward from the seed container 103.

Each auger 135 slopes upward from a lower input end 135A connected to receive seeds from the seed container 103 to a discharge end 135B connected to direct the seeds from the auger 135 into a corresponding one of the seed delivery conduits 111. In FIG. 3 those rotatable augers 135 extending toward the viewer have been removed for clarity of illustration.

In the illustrated system 101 each auger 135 is connected to a corresponding seed delivery conduit 111 at a Y-junction 137. Each seed delivery conduit 111 is configured to slope downward and outward from the manifold 131, and a discharge conduit 139 slopes downward from the discharge end 135B of each auger 135 to the corresponding seed delivery conduit 111 at the Y-junction.

The seed delivery conduits 111 at the Y-junctions 137 carry the final air stream FAS and so are pressurized. When the augers 135 are filled with seeds they present a significant resistance to air flow from the pressurized Y-junctions 137 back into the unpressurized seed container 103 and seeds will fall down the discharge conduits 139 into the seed delivery conduit 111. Compared to the pressure of the primary air stream PAS at the fertilizer meter apparatus 123, the pressure of the final air stream FAS is significantly reduced near the open outlets of the seed delivery conduit 111, which are usually relatively close to the Y-junctions 137.

If the auger 135 filled with seeds does not provide enough resistance and air flows from the pressurized Y-junctions 137 back into the unpressurized seed container 103 a pressure equalization conduit 143 could be connected near the discharge of the meter 135B and the bottom of the seed container 103 to substantially equalize the pressure between the input and output of the auger 135, much the same as is done in the fertilizer meter apparatus 123 where the fertilizer product tank 125 is pressurized to the same pressure as the primary air stream PAS.

Since the seed container 103 is not sealed, the air conduit is connected to the bottom of the seed container 103 such that the seeds in the seed container 103 above the input of the pressure equalization conduit 143 will resist air flow out of the seed container through the screen 107A of the on-demand seed product dispenser 107.

Conveniently each auger is rotated by a corresponding auger motor 145, and a dispensing control 147 is operative to control each auger motor 145 independently to provide variable rates and overlap control. Alternatively the augers 135 could be driven by a single motor rotating a bevel gear under the center of the seed container 103 that drives a gear on each auger 135.

Figures 4, 5:
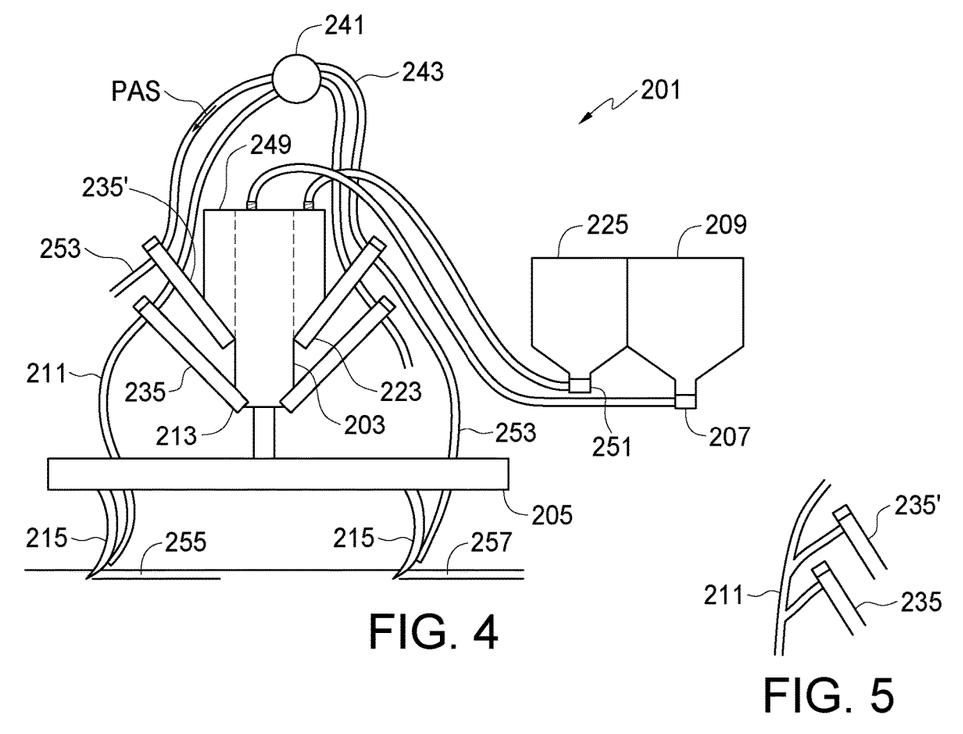
FIG. 4 is a schematic side view of a further alternate embodiment of the system of the present disclosure mounted where on-demand product dispensers convey seeds and fertilizers into separate containers on the frame.
FIG. 5 is a schematic side view of an alternate arrangement of the system of FIG. 4 where the seed and fertilizer delivery conduits are provided by the same conduit.

FIG. 4 schematically illustrates a further alternate product distribution system 201 of the present disclosure that also includes a fertilizer distribution system in a different arrangement. The system 201 comprises a seed container 203 mounted on an implement frame 205 of the air seeder that is located inside a fertilizer container 249. An on-demand seed product dispenser 207 is operative to convey a seed product from a seed product tank 209 into the seed container 203, and operative to maintain a selected level of the seed product in the seed container 203. A plurality of seed delivery conduits 211 extend generally radially outward in forward, rearward and lateral directions from the seed container 203 and a seed meter apparatus 213, again provided by augers 235, is connected to receive the seed product from the seed container 203 and meter seeds of the seed product substantially equally into each of the seed delivery conduits 211 and to the furrow openers 215. Again in FIG. 4 those rotatable augers 235, 235' extending toward the viewer have been removed for clarity of illustration.

The fertilizer container 249 is formed around the seed container 203 again forming a compact arrangement. An on-demand fertilizer product dispenser 251 is operative to convey a fertilizer product from a fertilizer product tank 225 into the fertilizer container 249, and operative to maintain a level of the fertilizer product in the fertilizer container 249 above a selected level.

A plurality of fertilizer delivery conduits 253 extends again generally radially outward from the fertilizer container 249, and a fertilizer meter apparatus 223, here also provided by augers 235', is connected to receive the fertilizer product from the fertilizer container 249 and meter the fertilizer product substantially equally into each of the fertilizer delivery conduits 253.

A pressurized air source 241 is operative to direct a pressurized air stream PAS through air conduits 243 into the seed delivery conduits 211 and the fertilizer delivery conduits 253.

In the system 201 the seed container 203 is shown inside the fertilizer container 249, however it is contemplated that either seeds or fertilizer can be carried into either container 203, 249 from the corresponding product tanks 209, 225.

The seed conduits 211 are connected to deliver seeds from the seed metering apparatus 213 to seed furrows 255 created by furrow openers 215 mounted on the implement frame 205 and the fertilizer conduits 253 are connected to deliver fertilizer product from the fertilizer metering apparatus 223 to fertilizer furrows 257 created by furrow openers 215 mounted on the implement frame 205.

Alternately as schematically illustrated in FIG. 5, the seed and fertilizer can both be directed into the same seed delivery conduit and be deposited in the seed furrow. As described above with respect to the system 101 shown in FIG. 3, it may be desired to provide some of the fertilizer from the fertilizer container 249 to each of the seed and fertilizer furrows 255, 257. For example dual fertilizer metering augers 235' may be provided with one directing fertilizer to the seed furrow 255 and one directing fertilizer to the fertilizer furrow 257. The discharge from the fertilizer dispensing augers 235' may also be divided at a Y-junction using an apportionment valve.

Figure 6:
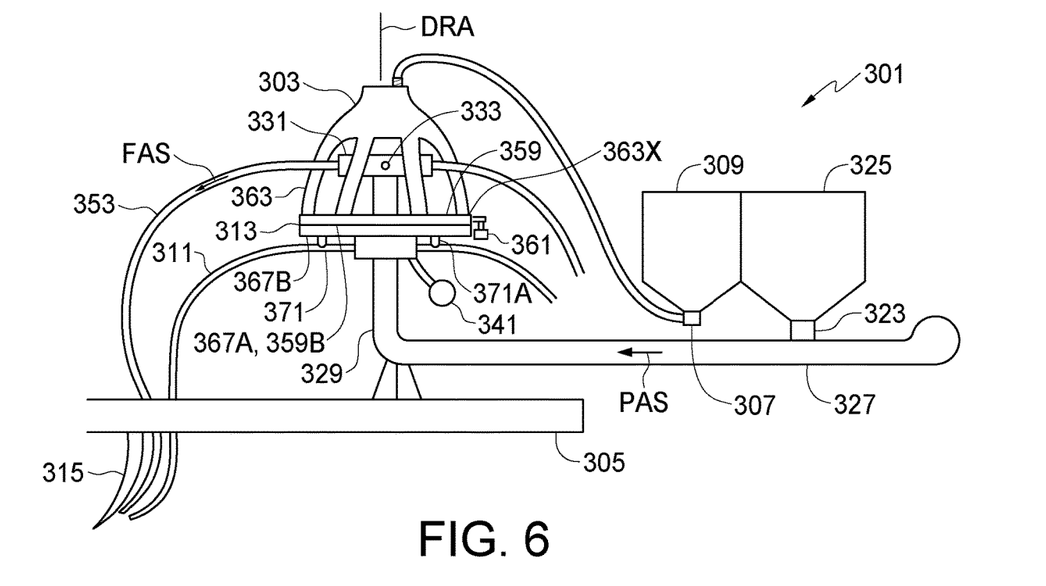
FIG. 6 is a schematic side view of a further alternate embodiment of the system of the present disclosure mounted in cooperation with a conventional product distribution system and where the seed metering apparatus provides singulation of the seeds.
Figure 7:
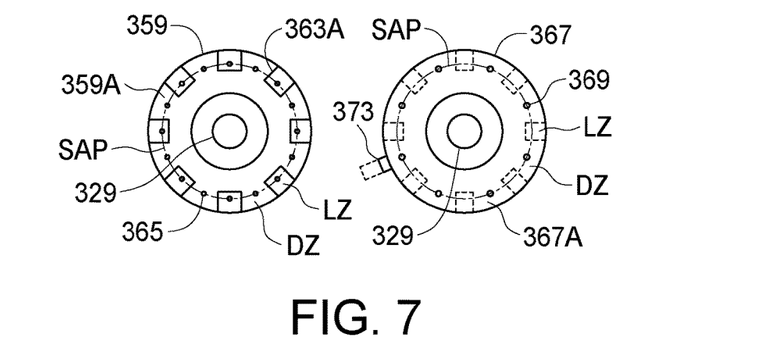
FIG. 7 is a schematic top view of the seed disc and dispensing plate of the metering apparatus of FIG. 6.

FIGS. 6 and 7 schematically illustrate a further alternate product distribution system 301 of the present disclosure again built around a conventional product distribution system. A fertilizer meter apparatus 323 is operative to dispense a fertilizer product from a fertilizer product tank 325 into a primary air stream PAS flowing through a primary conduit 327. A substantially vertically oriented supply conduit 329, as is known in the art, is mounted on the implement frame 305 and connected to the primary conduit 327 and is operative to receive at least a portion of the primary air stream PAS. A manifold 331 is mounted on an upper end of the supply conduit 329, also as is known in the art, wherein the manifold 331 is operative to direct a final air stream FAS out of the manifold 331 through each of a plurality of manifold ports 333 spaced around a circumference of the manifold 331. A fertilizer delivery conduit 353 is connected at an input end to each manifold port 333, and connected at an output end to a furrow opener 315 mounted to the implement frame 305.

A seed container 303 is mounted on an implement frame 305 above the manifold 331. An on-demand seed product dispenser 307 is operative to convey a seed product from a seed product tank 309 into the seed container 303, and operative to maintain a selected level of the seed product in the seed container 303. A plurality of seed delivery conduits 311 extend generally radially outward in forward, rearward and lateral directions from the seed container 303 and a seed meter apparatus 313 is connected to receive the seed product from the seed container 303 and meter seeds of the seed product substantially equally into each of the seed delivery conduits 311 and to the furrow openers 315. In FIG. 6 those seed delivery conduits extending toward the viewer have been removed for clarity of illustration.

The seed metering apparatus 313 in the system 301 provides seed singulation which is preferred for some crops. The seed metering apparatus 313 comprises a seed disc 359 rotatably mounted under the seed container 303 about a substantially vertically oriented disc rotational axis DRA extending upward through the seed container 303, and a disc drive 361 operative to rotate the seed disc 359. A plurality of seed chutes 363 each slope downward from the seed container 303 to an open discharge end 363A configured to slide along an upper face 359A of an outer portion of the seed disc 359 as the seed disc rotates. The discharge ends 363A of the seed chutes 363 are substantially equally spaced around the outer portion of the seed disc 359. The discharge end 363A of each seed chute defines a loading zone LZ on the upper face 359A of the seed disc 359, and the space between adjacent seed chutes defines a discharge zone DZ.

A plurality of seed apertures 365 are defined in the outer portion of the seed disc 359 and extend through the seed disc 359 from the upper face 359A of the seed disc 359 to a lower face 359B of the seed disc, and each seed aperture 365 is configured to receive one of the seeds. The seed apertures 365 are substantially equally spaced along a seed aperture path SAP.

A stationary dispensing plate 367 is mounted under the seed aperture path SAP on the seed disc 359 such that the lower face 359B of the seed disc 359 slides along an upper face 367A of the dispensing plate 367. The dispensing plate 367 is solid and defines a plurality of dispensing apertures 369, each located on the seed aperture path SAP under a corresponding discharge zone DZ between adjacent seed chutes 363. Each dispensing aperture 369 extends through the dispensing plate 367 from the upper face 367A of the dispensing plate to a lower face 367B of the dispensing plate and is configured to allow one of the seeds to pass through into one of the seed delivery conduits 311.

Figure 8:
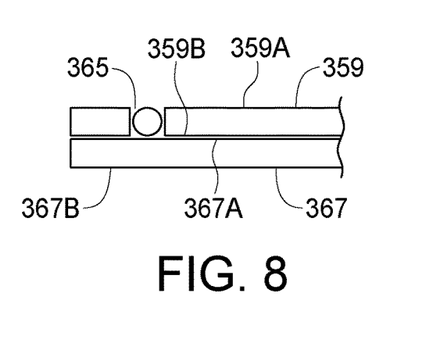
FIG. 8 is a schematic sectional side view of the seed disc and dispensing plate of FIG. 7 oriented such that a seed carried out of the loading zone is blocked by the dispensing plate.
Figure 9:
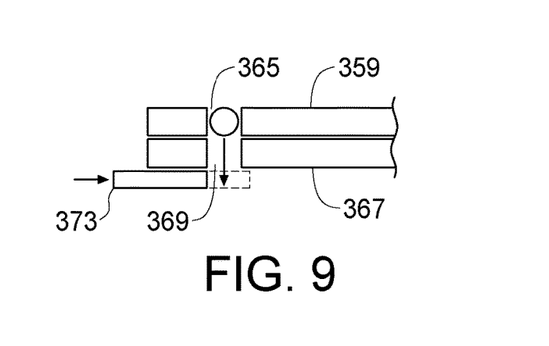
FIG. 9 is a schematic sectional side view of the seed disc and dispensing plate of FIG. 7 oriented such that a seed carried out of the loading zone falls through the dispensing plate, and showing a gate movable to a position to block the seed from falling through the dispensing plate.

FIG. 8 schematically illustrates a seed carried out of the loading zone LZ and blocked by the dispensing plate 367 until it rotates to the position shown in FIG. 9 where the seed aperture 365 is aligned with the dispensing aperture 369 and the seed falls through into the air stream below.

The seed container 303 is mounted above the manifold 331, and the seed disc 359 is rotatably mounted below the manifold 331 with the supply conduit 329 extending upward through an open middle portion of the seed disc 359 and through an open middle portion of the dispensing plate 367. The seed chutes 363 extend downward from the seed container 303 to the seed disc 359 between the fertilizer delivery conduits 353.

The seed apertures 365 can be sized according to the seeds being planted, and the spacing along the seed aperture path SAP as well as the speed of rotation of the seed disc 359 can be varied to provide a desired application rate. Gates 373, as seen in FIG. 9, can be provided to selectively extend under corresponding dispensing apertures 369 to a position illustrated by phantom lines to selectively block and unblock the dispensing apertures 369 to provide individual product shut off to each furrow opener to provide overlap control.

A pressurized air source 341 directs a pressurized air stream through each seed delivery conduit 311. Each seed delivery conduit 311 includes a venturi section 371 with a venturi inlet 371A located under each dispensing aperture 369 such that seeds passing through each dispensing aperture 369 are introduced into a corresponding seed delivery conduit 311.

Figure 10:
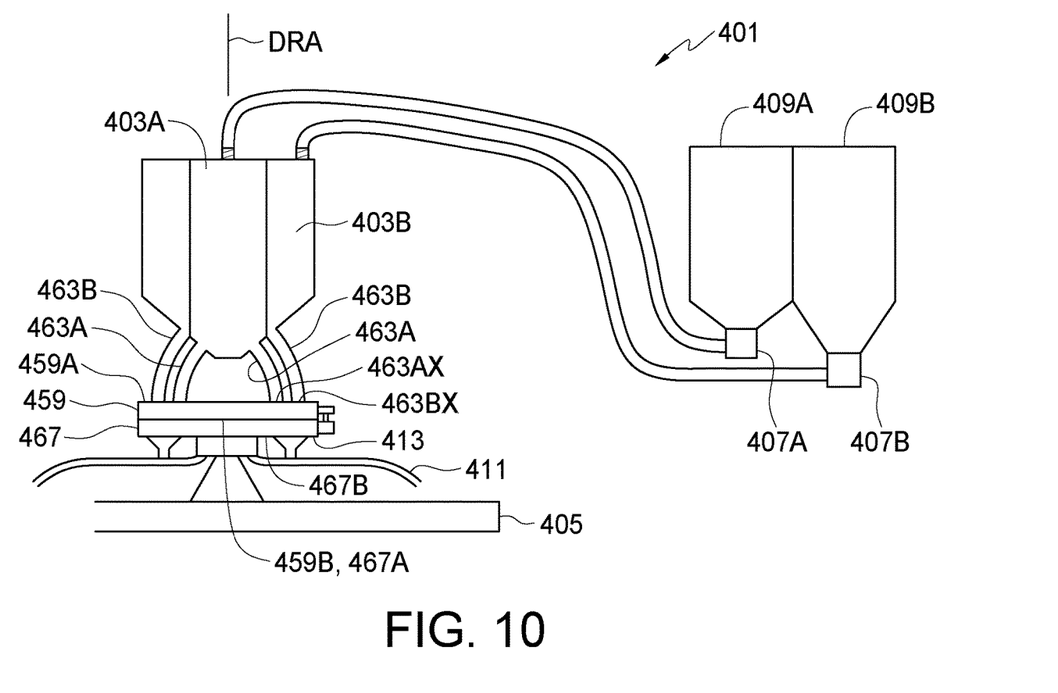
FIG. 10 is a schematic side view of a further alternate embodiment of the system of the present disclosure where the seed metering apparatus provides singulation of first and second different seeds.
Figure 11:
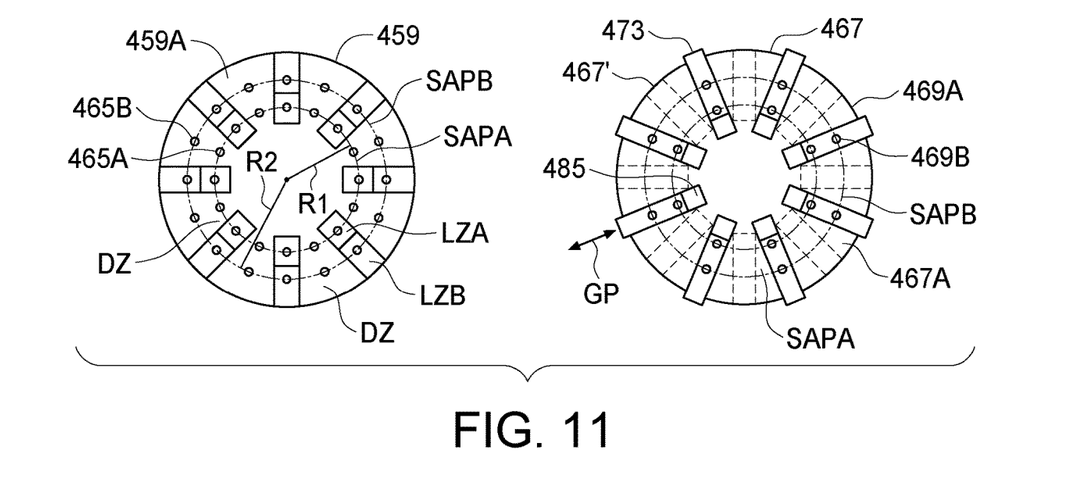
FIG. 11 is a schematic top view of the seed disc and dispensing plate of the metering apparatus of FIG. 10.

FIGS. 10 and 11 schematically illustrate a further alternate product distribution system 401 of the present disclosure comprising first and second seed containers 403A, 403B mounted on the implement frame 405 of an air seeder. The illustrated first seed container 403A is surrounded by the second seed container 403B. Corresponding first and second on-demand seed product dispensers 407A, 407B operative to convey first and second seed products from corresponding first and second seed product tanks 409A, 409B into the corresponding first and second seed containers 403A, 403B, and to maintain a level of the seed products in the seed containers above a selected level. The system 401 is useful where it is desired to seed two different seed varieties at different places in a field. Typically this would be different hybrid seeds of the same crop, for example corn.

The seed metering apparatus 413 comprises a seed disc 459 rotatably mounted under the first and second seed containers 403A, 403B about a substantially vertically oriented disc rotational axis DRA extending upward. A plurality of first seed apertures 465A defined in the seed disc 459 and extending through the seed disc from an upper face 459A of the seed disc to a lower face 459B of the seed disc. Each first seed aperture 465A is configured to receive one of the first seeds, and the first seed apertures 465A are substantially equally spaced along a first seed aperture path SAPA a first radial distance R1 from the disc rotational axis DRA.

A plurality of second seed apertures 465B is defined in the seed disc 459 and extending through the seed disc from the upper face 459A of the seed disc to the lower face 459B of the seed disc. Each second seed aperture 465B is configured to receive one of the second seeds, and the second seed apertures 465B are substantially equally spaced along a second seed aperture path SAPB that is a second radial distance R2 from the disc rotational axis DRA that is greater than the first radial distance R1.

Each of a plurality of first seed chutes 463A slopes downward from the first seed container 403A to an open discharge end 463AX configured to slide along the upper face 459A of the seed disc as the seed disc 459 rotates, and the discharge ends 463AX of the first seed chutes 463A define first loading zones LZA substantially equally spaced along the first seed aperture path SAPA.

Each of a plurality of second seed chutes 463B slopes downward from the second seed container 403B to an open discharge end 463BX configured to slide along the upper face 459A of the seed disc as the seed disc 459 rotates, and the discharge ends 463BX of the second seed chutes 463B define second loading zones LZB substantially equally spaced along the second seed aperture path SAPB and radially aligned with the first loading zones LZA. Each space on the upper face 459A of the seed disc between adjacent first loading zones LZA defines a corresponding discharge zone DZ, and each space on the upper face 459A of the seed disc between adjacent second loading zones LZB defines a corresponding discharge zone DZ.

A stationary dispensing plate 467 is mounted under the first and second seed aperture paths SAPA, SAPB on the seed disc 459 such that the lower face 459B of the seed disc 459 slides along an upper face 467A of the dispensing plate 467.

The dispensing plate 467 is solid and defines a plurality of first dispensing apertures 469A each located on the first seed aperture path SAPA under one of the discharge zones DZ, and the dispensing plate 467 defines a plurality of second dispensing apertures 469B, each second dispensing aperture 469B located on the second seed aperture path SAPB under one of the discharge zones DZ and radially aligned from the disc rotational axis DRA with a corresponding first dispensing aperture 469A.

Each first and second dispensing aperture 469A, 469B extends through the dispensing plate 467 from the upper face 467A of the dispensing plate to a lower face 467B of the dispensing plate and is configured such that a first seed in one of the first seed apertures 465A passing over one of the first dispensing apertures 469A as the seed disc 459 rotates falls through the dispensing plate 467 into one of the seed delivery conduits 411 and such that a second seed in one of the second seed apertures 465B passing over one of the second dispensing apertures 469B as the seed disc 459 rotates falls through the dispensing plate 467 into one of the seed delivery conduits 411.

Figure 12:
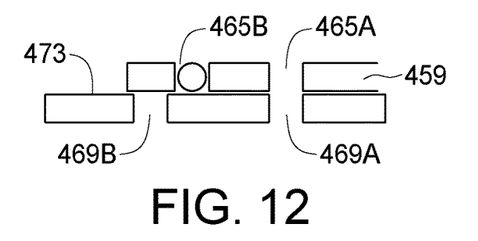
FIG. 12 is a schematic sectional side view of a gate of the embodiment of FIG. 10 in a first mode blocking the second dispensing apertures such that only first seeds pass through the dispensing plate through the first dispensing apertures.
Figure 13:
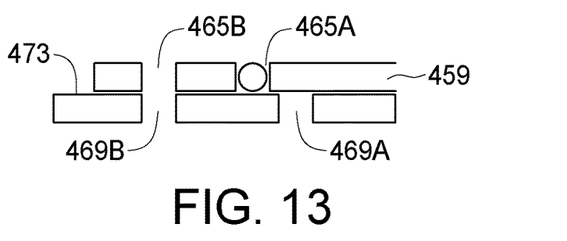
FIG. 13 is a schematic sectional side view of the gate of FIG. 12 in a second mode blocking the first dispensing apertures such that only second seeds pass through the dispensing plate through the second dispensing apertures.
Figure 14:
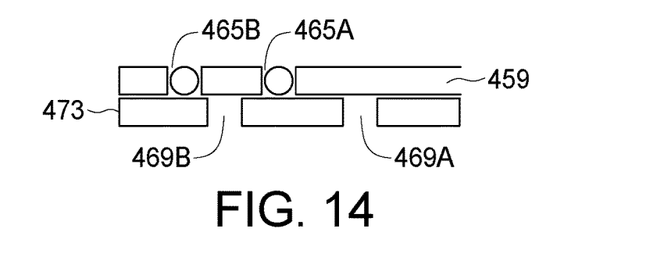
FIG. 14 is a schematic sectional side view of the gate of FIG. 12 in a third mode blocking both the first and second dispensing apertures such that no seeds pass through the dispensing plate.

A gate 473 is located in each discharge zone DZ and is schematically illustrated in FIGS. 12-14. Each gate 473 forms a part of the dispensing plate 467 and is movable with respect to a stationary portion 467' of the dispensing plate 467. Each gate 473 defines one of the first dispensing apertures 469A and defines one of the second dispensing apertures 469B.

Each gate 473 is slidable radially inward and outward in an opening 485 defined by the stationary portion 467' of the dispensing plate 467 as indicated by the arrow GP in FIG. 11. It is contemplated that incorporating the gate 473 into the dispensing plate 467, as opposed to placing the gate 373 under the dispensing plate 367 as in the system 301 shown in FIGS. 8 and 9, will provide more consistent seed spacing. With the gate under the dispensing plate, when a seed is blocked it will sit in the dispensing apertures 469A, 469B and when the gate is moved to open the dispensing aperture, another seed may well be following closely from a seed aperture.

Each gate is operative in a first mode shown in FIG. 12 to block the second dispensing apertures 469B such that only first seeds pass through the dispensing plate 467 through the first dispensing apertures 469A, and operative in a second mode shown in FIG. 13 to block the first dispensing apertures 469A such that only second seeds pass through the dispensing plate 467 through the second dispensing apertures 469B. The gate 473 is also operative in a third mode shown in FIG. 14 to block both the first and second dispensing apertures 469A, 469B such that no seeds pass through the dispensing plate 467.

Figure 15:
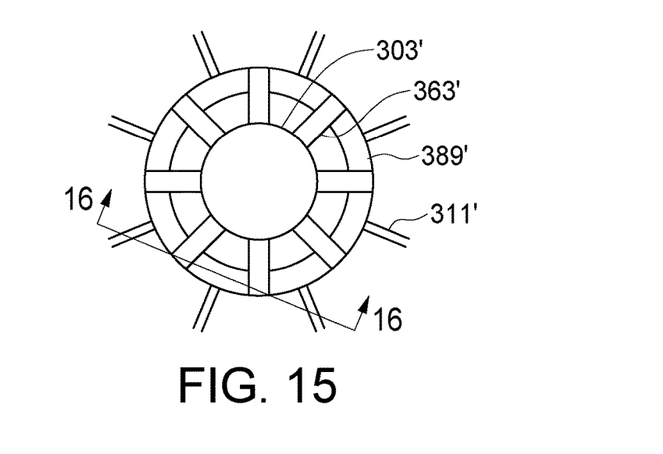
FIG. 15 is a schematic top view of a singulating meter system where the seed chutes slope downward to a housing which covers the top side of the seed disc, and where seals at each dispensing aperture prevent air from escaping from the seed delivery conduits.
Figure 16:
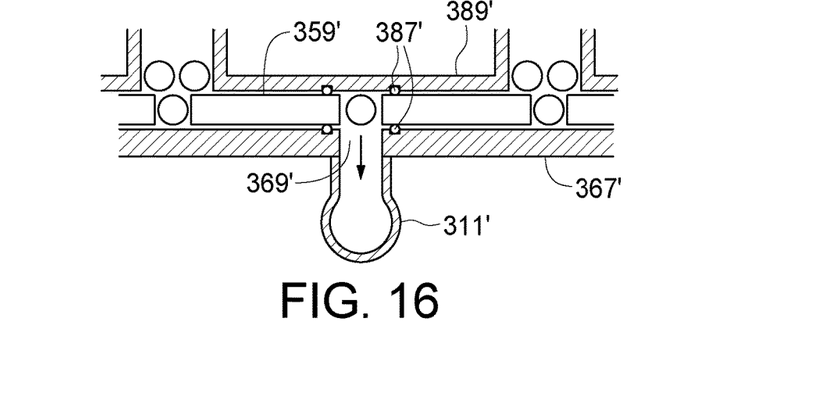
FIG. 16 is a schematic sectional view along line 16-16 in FIG. 15.

In the system 301 described above each seed delivery conduit 311 includes a venturi section 371 with a venturi inlet 371A located under each dispensing aperture 369 such that seeds passing through each dispensing aperture 369 are introduced into a corresponding seed delivery conduit 311. FIGS. 15 and 16 schematically illustrates an alternate arrangement where a seal at each dispensing aperture 369' is operative to substantially prevent air from escaping from the corresponding seed delivery conduit 311'.

Here the seed chutes 363' each slope downward from the seed container 303' to a housing 389' which covers the top side of the seed disc 359 such that the seed disc slides between the housing 389' and the stationary dispensing plate 367' as it rotates. At each dispensing aperture 369' the seal is provided by O-rings 387' which seal the dispensing aperture between the seed disc 359' and the housing 389', and between the seed disc and the dispensing plate 367' such that the pressurized air flowing through the seed delivery conduit 311' does not escape.

The present disclosure thus provides a method of distributing seeds of a seed product to each of a plurality of furrow openers 15 mounted on an implement frame 5 of an air seeder. The method comprises mounting a plurality of seed containers 3 on the implement frame 5 and spaced across a width of the implement frame 5; providing a plurality of seed delivery conduits 11 extending radially outward from each seed container 3; conveying the seed product from a seed product tank 9 into each seed container 3 and maintaining a level of the seed product in each seed container 3 above a selected level SL; metering the seeds from a bottom of each seed container 3 into each of the seed delivery conduits.

The method can further provide an agricultural product distributor including a fertilizer distribution system by providing a fertilizer product tank 125 and a fertilizer meter apparatus 123 operative to dispense a fertilizer product from the fertilizer product tank 125 into a primary air stream PAS flowing through a primary conduit 127; mounting a substantially vertically oriented supply conduit 129 on the implement frame extending upward through each seed container 103 and connecting each supply conduit 129 to the primary conduit 127 to receive a portion of the primary air stream PAS; mounting a manifold 131 on an upper end of each supply conduit 129 and directing a final air stream FAS out of the manifold 131 through each of a plurality of manifold ports 133 spaced around a circumference of the manifold; providing a plurality of fertilizer delivery conduits, and connecting an input end of each fertilizer delivery conduit to one of the manifold ports 133, and connecting an output end of each fertilizer delivery conduit to one of the furrow openers 115. The method can further comprise combining the seed delivery conduits and the fertilizer delivery conduits into a single conduit by connecting the discharge from each manifold port to the discharge from the seed metering apparatus into a corresponding seed delivery conduit at a Y-junction 137.

A further embodiment of the method of the present disclosure provides an agricultural product distributor including a fertilizer distribution system by providing a fertilizer product tank 225 and a fertilizer product dispenser 251; providing a plurality of product distributors, and for each product distributor providing a fertilizer container 249 mounted on the implement frame 205 and a plurality of fertilizer delivery conduits 253 extending radially outward from the fertilizer container, and for each product distributor providing a fertilizer meter apparatus 223 connected to receive the fertilizer product from the fertilizer container and operative to meter the fertilizer product into each of the fertilizer delivery conduits 253; locating one of the seed container 203 and fertilizer container 249 inside the other of the seed container and fertilizer container; conveying a fertilizer product from the fertilizer product tank 225 into each fertilizer container 249, and maintaining a level of the fertilizer product in the fertilizer container 249 above a selected level; and directing a pressurized air stream PAS through the seed delivery conduits 211 and the fertilizer delivery conduits 253.

A further embodiment of the method of the present disclosure provides seed singulating seed metering apparatuses 313 that deliver singulated seeds to each of a plurality of seed delivery conduits 311. The method comprises rotatably mounting a seed disc 359 under the seed container 303 about a substantially vertically oriented disc rotational axis DRA extending upward through the seed container, and a disc drive 361 operative to rotate the seed disc; providing a plurality of seed chutes 363, each seed chute sloping downward from the seed container to an open discharge end 363A configured to slide along an upper face of an outer portion of the seed disc as the seed disc 359 rotates, and spacing the discharge ends 363A of the seed chutes substantially equally around the outer portion of the seed disc 359 such that the discharge end of each seed chute defines a loading zone LZ, and each space between adjacent seed chutes defines a discharge zone DZ; defining a plurality of seed apertures 365 in the outer portion of the seed disc 359 that extend through the seed disc from the upper face 359A of the seed disc to a lower face 359B of the seed disc and configuring each seed aperture to receive one of the seeds and spacing the seed apertures 365 substantially equally along a seed aperture path SAP; mounting a stationary dispensing plate 367 under the seed aperture path on the seed disc such that the lower face 359B of the seed disc 359 slides along an upper face 367A of the dispensing plate 367; defining a plurality of dispensing apertures 369 in the dispensing plate such that each dispensing aperture is located on the seed aperture path SAP at a corresponding discharge zone DZ, and each dispensing aperture extends through the dispensing plate 367 from the upper face 367A of the dispensing plate to a lower face 367B of the dispensing plate 367 and configuring each dispensing aperture 369 to allow one of the seeds to pass through into one of the seed delivery conduits 311.

Second seed discs and seed containers can be provided such that either first or second different seeds may be selectively dispensed singly to each furrow opener.

Figure 17:
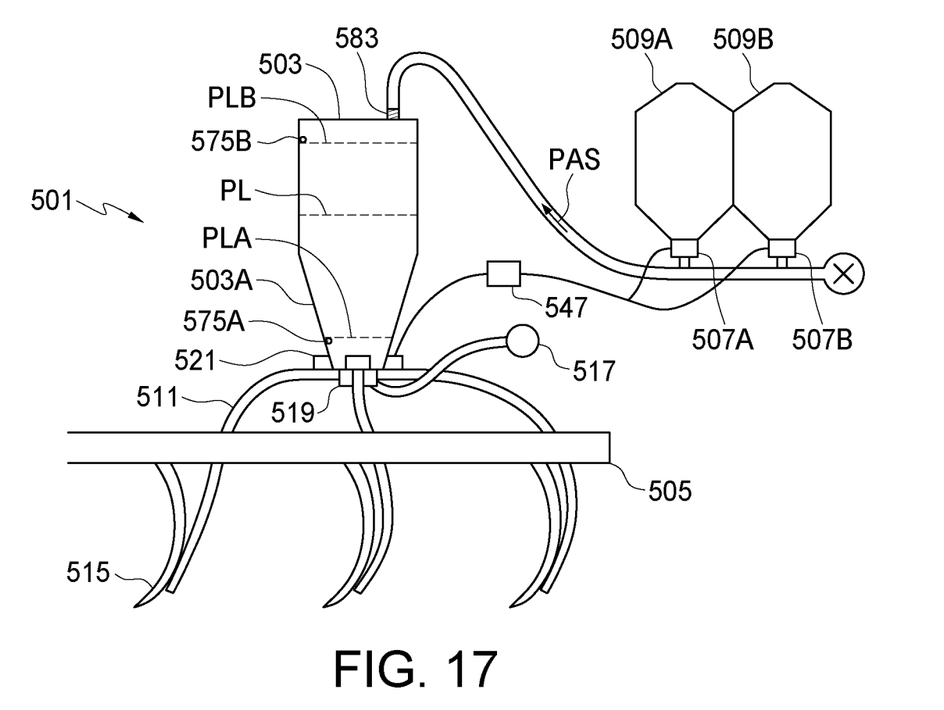
FIG. 17 a schematic side view of a further alternate embodiment of the system of the present disclosure where products from two different product tanks are metered at varying rates into a mixed product container, and then metered from the mixed product container to furrow openers.

FIG. 17 schematically illustrates a product distribution system 501 of the present disclosure for an air seeder. The system 501 combines two, or more, different products in selected proportions and delivers the mixed product to a plurality of delivery conduits 511. Typically the products would be fertilizer products with different proportions of various nutrients, the proportions of each can be changed based on a field map and the location of the air seeder as determined by an external guidance system using Global Positioning Satellites (GPS) or the like as is known in the art. It is contemplated as well that other agricultural products could be distributed as well.

The system 501 comprises a mixed product container 503 mounted on an implement frame 505 of the air seeder. A first primary meter 507A is operative to meter a first product from a first product tank 509A into the mixed product container 503, and a second primary meter 507B is operative to meter a second product from a second product tank 509B into the mixed product container 503. In the illustrated system 501 the first and second primary meters 507A, 507B meter the corresponding first and second products into a primary air stream PAS connected to convey the first and second products into the mixed product container 503 where products are separated from the primary air stream PAS by a screen 583 and fall into the mixed product container 503.

Typically a pressurized air source 517 will direct a pressurized air stream into a plenum 519 connected to each seed delivery conduit 511 to convey the mixed product through the delivery conduits 511 to the furrow openers 515.

Each of a plurality of container meters 521 is operative to meter a mixed product from the mixed product container 503 into a corresponding delivery conduit 511 at a selected mixed dispensing rate such that the mixed product is dispensed from the mixed product container 503 at a total mixed dispensing rate which is the sum of the rates of each container meter. A meter control 547 is operative to control a first dispensing rate of the first primary meter 507A, a second dispensing rate of the second primary meter 507B, and the total mixed dispensing rate dispensed by all the container meters 521.

Where it is desired to provide variable rates or shut-off for overlap control, the meter control 547 is operative to control each container meter 521 to provide a mixed dispensing rate independent of the mixed dispensing rate of any other container meter 521. The meter control 547 is operative to substantially simultaneously start and stop the first and second primary meters 507A, 507B to maintain a level of mixed product in the mixed product container above a minimum level PLA so that mixed product is available to the container meters 521 at all times during operation.

In the illustrated system 501 the delivery conduits 511 extend generally radially outward from the mixed product container 503 in forward and rearward directions, and laterally from the mixed product container 503, and the lower walls 503A of the mixed product container slope 503 inward.

A minimum level sensor 575A is connected to the meter control 547 to indicate that the level of mixed product in the mixed product container has reached the minimum level PLA, and a maximum level sensor 575B is connected to the meter control 547 to indicate that the level of mixed product in the mixed product container has reached a maximum level PLB.

The meter control 547 is operative to substantially simultaneously start and stop the first and second primary meters 507A, 507B to maintain a level PL of mixed product in the mixed product container 503 above a minimum level PLA. The meter control 547 simultaneously starts the first and second primary meters 507A, 507B when the level of mixed product in the mixed product container 503 has reached the minimum level PLA, and stops the first and second primary meters 507A, 507B when the level of mixed product in the mixed product container 503 has reached the maximum level PLB.

The meter control 547 is operative maintain a sum of the first and second dispensing rates at a total primary dispensing rate into the mixed product container 503 that is greater than the total mixed dispensing rate out of the mixed product container 503. The level of mixed product is thus maintained at a level PL somewhere between the minimum level PLA and the maximum level PLB.

Figure 18:
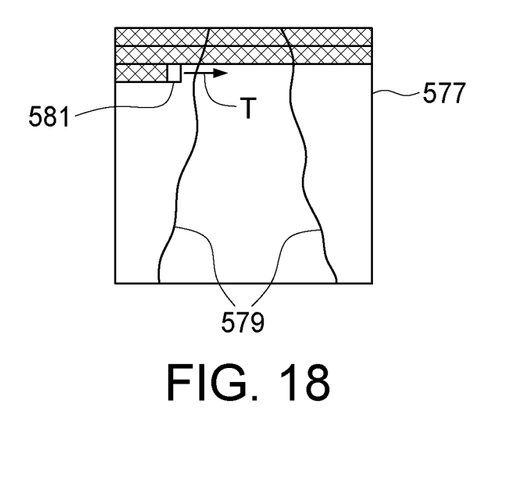
FIG. 18 is a schematic top view of a field map showing the location of the air seeder and rate change locations in the field.

The meter control 547 includes an external guidance system as is known in the art and a field map 577 such as schematically illustrated in FIG. 18 which indicates rate change locations 579 where at least one of the first and second dispensing rates is changed as the air seeder 581 with the system 501 moves across a field in operating travel direction T. From the speed of the air seeder 581 and an approaching rate change location the meter control 547 is operative to predict the future time when a desired change in one of the first and second dispensing rates will occur, and then to control the first and second primary meters 507A, 507B such that the level PL of mixed product in the mixed product container 503 is at the minimum level PLA at the predicted future time.

Figure 19:
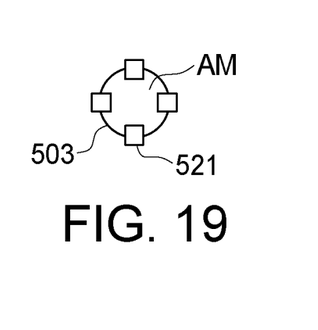
FIG. 19 is a schematic top sectional view through the bottom of the mixed product container just above the container meters.

It is desirable to minimize the volume of product at the change since product does not flow uniformly out of the mixed product container 503, and new changed product coming in does, to some extent, flow through the old product to the meters 521. Since the delivery conduits 511 extend generally radially outward from the mixed product container 503, the container meters 521 can be located close to each other so that, as schematically illustrated in FIG. 19, the area AM that needs to be covered to ensure mixed product is available to the container meters 521 is small, and the corresponding volume of mixed product is small. Placing the minimum level PLA of mixed product near the bottom of the mixed product container 503 also minimizes the volume of product remaining when a change occurs.

Thus the desired change of the mixed product in the mixed product container 503 from the initial proportions to the changed proportions will take effect quickly, as the amount of remaining initial mixed product is small, and so the container meters 521 will quite quickly begin to dispense the changed mixed product.

The present disclosure further provides a method of distributing agricultural products to furrow openers of an air seeder. The method comprises metering a first product at a first dispensing rate from a first product tank 509A into a mixed product container 503 mounted on an implement frame 505 of the air seeder; metering a second product at a second dispensing rate from a second product tank 507B into the mixed product container 503; metering a mixed product at a total mixed dispensing rate from the mixed product container 503 into a plurality of delivery conduits 511, and connecting an output of each delivery conduit to a furrow opener 515; substantially simultaneously starting and stopping metering the first and second products to maintain a level PL of mixed product in the mixed product container 503 above a minimum level PLA.

It can be seen that the present disclosure provides a versatile and compact product distribution system where the seed containers are mounted on the implement frame in proximity to the furrow openers and can be supplied by an on-demand seed product dispenser. Seed delivery conduits extend radially in all directions from the seed container such that the distance between the seed container and the furrow openers, which are typically also located in all directions from the seed container, can be minimized. The system is shown in use with a conventional fertilizer distribution system, and also with on-demand product dispensers conveying seeds and fertilizers into separate containers on the frame, and various metering systems and delivery conduit arrangements that can readily be used with the disclosed system. Singulation of seeds is also provided.

The present disclosure also provides a product distribution system that conveniently transfers products from two different product tanks 509A, 509B and mixes them into a mixed product container 503 at varying desired proportions. The mixed product is then delivered to the furrow openers 515 of the air seeder with proportions of each product changing according to rate change locations 579 indicated on a field map 577.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A product distribution system for an air seeder, the system comprising:
a plurality of furrow openers mounted on an implement frame of the air seeder;
a plurality of product distributors mounted on the implement frame, each product distributor comprising:
a seed container;
a plurality of seed delivery conduits extending radially outward from the seed container;
a seed meter apparatus connected to receive a seed product from the seed container and operative to meter seeds of the seed product into each of the seed delivery conduits;
a seed product dispenser operative to convey the seed product from a seed product tank into each seed container, and operative to maintain a level of the seed product in each seed container above a selected level;
wherein the product distributors are spaced across a width of the implement frame.

2. The system of claim 1 wherein the implement frame comprises a plurality of lateral frame members extending across the width of the implement frame and spaced between a front of the implement frame and a rear of the implement frame, and the plurality of furrow openers is spaced along the lateral frame members, and wherein the seed delivery conduits extend radially outward from each seed container and connect to selected furrow openers located forward, rearward, right, or left of the seed container.

3. The system of claim 1 wherein seed product dispenser is one of an on-demand dispenser and a meter.

4. The system of claim 1 comprising a pressurized air source operative to direct a pressurized air stream into a plenum connected to each seed delivery conduit, such that an air stream flows through each seed delivery conduit.

5. The system of claim 4 wherein each seed meter apparatus is operative to resist air flow from the seed delivery conduits to the corresponding seed container.

6. The system of claim 1 comprising a fertilizer product tank and a fertilizer meter apparatus operative to dispense a fertilizer product from the fertilizer product tank into a primary air stream flowing through a primary conduit and wherein each product distributor comprises:
a substantially vertically oriented supply conduit mounted on the implement frame and connected to the primary conduit and operative to receive a portion of the primary air stream;
a manifold mounted on an upper end of the supply conduit, wherein the manifold is operative to direct a final air stream out of the manifold through each of a plurality of manifold ports spaced around a circumference of the manifold;
a plurality of fertilizer delivery conduits, each connected at an input end to one of the manifold ports, and connected at an output end to one of the furrow openers;
wherein the supply conduit extends upward through the seed container.

7. The system of claim 6 wherein the seed delivery conduits are provided by the fertilizer delivery conduits.

8. The system of claim 7 wherein the seed meter apparatus is connected to each seed delivery conduit at a Y-junction.

9. The system of claim 8 comprising an air conduit connected at a bottom of an interior of the seed container and to an output of the seed meter apparatus at each Y-junction to substantially equalize air pressure across the seed meter apparatus.

10. The system of claim 6 wherein the seed meter apparatus comprises a plurality of rotatable augers extending radially outward from the seed container, each auger sloping upward from a lower input end connected to receive seeds from the seed container to a discharge end connected to direct the seeds from the auger into a corresponding one of the seed delivery conduits.

11. The system of claim 10 wherein each fertilizer delivery conduit slopes downward and outward from the manifold, and comprising a discharge conduit sloping downward from the discharge end of each auger to the corresponding fertilizer delivery conduit.

12. The system of claim 10 wherein each auger is rotated by a corresponding auger motor, and comprising a dispensing control operative to control each auger motor independently.

13. The system of claim 1 wherein each product distributor comprises:
a fertilizer container mounted on the implement frame;
a plurality of fertilizer delivery conduits extending radially outward from the fertilizer container;
a fertilizer meter apparatus connected to receive the fertilizer product from the fertilizer container and operative to meter the fertilizer product into each of the fertilizer delivery conduits;
wherein one of the seed container and the fertilizer container is located inside the other of the seed container and the fertilizer container;
wherein a fertilizer product dispenser is operative to convey a fertilizer product from a fertilizer product tank into each fertilizer container, and is operative to maintain a level of the fertilizer product in the fertilizer container above a selected level; and
wherein a pressurized air source is operative to direct a pressurized air stream through the seed delivery conduits and the fertilizer delivery conduits.

14. The system of claim 13 wherein the fertilizer product dispenser is one of an on-demand dispenser and a meter.

15. The system of claim 13 wherein the seed conduits are connected to deliver seeds from the seed metering apparatus to seed furrows created by seed furrow openers mounted on the implement frame and the fertilizer conduits are connected to deliver fertilizer product from the fertilizer metering apparatus to fertilizer furrows created by fertilizer furrow openers mounted on the implement frame.

16. The system of claim 13 wherein the fertilizer conduits are provided by the seed conduits, and wherein the fertilizer conduits are connected to deliver seeds and fertilizer product from the fertilizer metering apparatus to combined seed and fertilizer furrows created by the furrow openers mounted on the implement frame.

17. The system of claim 1 wherein each seed metering apparatus comprises:
a seed disc rotatably mounted under the seed container about a substantially vertically oriented disc rotational axis extending upward through the seed container, and a disc drive operative to rotate the seed disc;
a plurality of seed chutes, each seed chute sloping downward from the seed container to an open discharge end configured to slide along an upper face of an outer portion of the seed disc as the seed disc rotates, and wherein the discharge ends of the seed chutes are substantially equally spaced around the outer portion of the seed disc;

wherein the discharge end of each seed chute defines a loading zone, and each space between adjacent seed chutes defines a discharge zone;

a plurality of seed apertures defined in the outer portion of the seed disc and extending through the seed disc from the upper face of the seed disc to a lower face of the seed disc, each seed aperture configured to receive one of the seeds, wherein the seed apertures are substantially equally spaced along a seed aperture path;

a stationary dispensing plate mounted under the seed aperture path on the seed disc such that the lower face of the seed disc slides along an upper face of the dispensing plate;

wherein the dispensing plate defines a plurality of dispensing apertures, each dispensing aperture located on the seed aperture path at a corresponding discharge zone, and each dispensing aperture extending through the dispensing plate from the upper face of the dispensing plate to a lower face of the dispensing plate and configured to allow one of the seeds to pass through into one of the seed delivery conduits.

18. The apparatus of claim 17 comprising:
a fertilizer product tank and a fertilizer meter apparatus operative to dispense a fertilizer product from the fertilizer product tank into a primary air stream flowing through a primary conduit;
a substantially vertically oriented supply conduit mounted on the implement frame and connected to the primary conduit and operative to receive a portion of the primary air stream, and a manifold mounted on an upper end of the supply conduit, wherein the manifold is operative to direct a final air stream out of the manifold through each of a plurality of manifold ports spaced around a circumference of the manifold;
a plurality of fertilizer delivery conduits, each fertilizer delivery conduit connected at an input end to each manifold port, and connected at an output end to a furrow opener mounted to the implement frame; and
wherein the seed container is mounted above the manifold, and the seed disc is rotatably mounted below the manifold with the supply conduit extending upward through an open middle portion of the seed disc and through an open middle portion of the dispensing plate, and wherein the seed chutes extend downward from the seed container to the seed disc between the fertilizer delivery conduits.

19. The apparatus of claim 17 comprising a pressurized air stream flowing through each seed delivery conduit, and wherein each seed delivery conduit includes a venturi section with a venturi inlet located under each dispensing aperture such that seeds passing through each dispensing aperture are introduced into a corresponding seed delivery conduit.

20. The apparatus of claim 17 comprising a pressurized air stream flowing through each seed delivery conduit, and comprising a seal at each dispensing aperture operative to substantially prevent air from escaping from the corresponding seed delivery conduit.

21. The system of claim 17 further comprising a plurality of gates, each gate operative to selectively block a corresponding one of the dispensing apertures.

22. The system of claim 1 wherein each product distributor comprises first and second seed containers mounted on the implement frame of the air seeder and wherein each seed metering apparatus comprises:

a seed disc rotatably mounted under the first and second seed containers about a substantially vertically oriented disc rotational axis extending upward;

a plurality of first seed apertures defined in the seed disc and extending through the seed disc from an upper face of the seed disc to a lower face of the seed disc, each first seed aperture configured to receive one of the first seeds, wherein the first seed apertures are substantially equally spaced along a first seed aperture path a first radial distance from the disc rotational axis;

a plurality of second seed apertures defined in the seed disc and extending through the seed disc from the upper face of the seed disc to the lower face of the seed disc, each second seed aperture configured to receive one of the second seeds, wherein the second seed apertures are substantially equally spaced along a second seed aperture path a second radial distance from the disc rotational axis that is greater than the first radial distance;

a plurality of first seed chutes, each first seed chute sloping downward from the first seed container to an open discharge end configured to slide along the upper face of the seed disc as the seed disc rotates, and wherein the discharge ends of the first seed chutes define first loading zones substantially equally spaced along the first seed aperture path;

a plurality of second seed chutes, each second seed chute sloping downward from the second seed container to an open discharge end configured to slide along the upper face of the seed disc as the seed disc rotates, and wherein the discharge ends of the second seed chutes define second loading zones substantially equally spaced along the second seed aperture path and radially aligned with the first loading zones;

wherein each space on the upper face of the seed disc between adjacent first loading zones defines a corresponding discharge zone and each space on the upper face of the seed disc between adjacent second loading zones defines a corresponding discharge zone;

a stationary dispensing plate mounted under the first and second seed aperture paths on the seed disc such that the lower face of the seed disc slides along an upper face of the dispensing plate;

wherein the dispensing plate is solid and defines a plurality of first dispensing apertures, each first dispensing aperture located on the first seed aperture path under one of the discharge zones, and defines a plurality of second dispensing apertures, each second dispensing aperture located on the second seed aperture path under one of the discharge zones and radially aligned with a corresponding first dispensing aperture;

wherein each first and second dispensing aperture extends through the dispensing plate from the upper face of the dispensing plate to a lower face of the dispensing plate and is configured such that a first seed in one of the first seed apertures passing over one of the first dispensing apertures as the seed disc rotates falls through the dispensing plate into one of the seed delivery conduits; and such that a second seed in one of the second seed apertures passing over one of the second dispensing apertures as the seed disc rotates falls through the dispensing plate into one of the seed delivery conduits; and a gate located in each discharge zone, each gate operative in a first mode to block the second dispensing apertures such that only first seeds pass through the dispensing plate, and operative in a second mode to block the first dispensing apertures such that only second seeds pass through the dispensing plate;

wherein a first seed product dispenser is operative to convey a first seed product from a first seed product tank into the first seed container, and is operative to maintain a level of the first seed product in the first seed container above a selected level; and wherein a second seed product dispenser is operative to convey a second seed product from a second seed product tank into the second seed container, and is operative to maintain a level of the second seed product in the second seed container above a selected level.

23. The system of claim 22 wherein each gate is operative in a third mode to block the first and second dispensing apertures such that no seeds pass through the dispensing plate.

24. The system of claim 22 wherein each gate forms a part of the dispensing plate and is movable with respect to a stationary portion of the dispensing plate, and wherein each gate defines one of the first dispensing apertures and defines one of the second dispensing apertures.

\* \* \* \* \*